(12) United States Patent
Roe

(10) Patent No.: US 8,044,772 B1
(45) Date of Patent: *Oct. 25, 2011

(54) EXPERT SYSTEM ASSISTANCE FOR PERSONS IN DANGER

(76) Inventor: Kevin Roe, San Jose, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 12/176,149

(22) Filed: Jul. 18, 2008

Related U.S. Application Data

(63) Continuation-in-part of application No. 11/787,494, filed on Apr. 16, 2007, now Pat. No. 7,667,609, which is a continuation-in-part of application No. 11/150,746, filed on Jun. 10, 2005, now Pat. No. 7,394,392.

(51) Int. Cl.
G08B 5/22 (2006.01)
G08B 23/00 (2006.01)
H04Q 1/30 (2006.01)

(52) U.S. Cl. ...... 340/7.5; 340/576; 340/573.1; 340/632; 422/84; 180/272; 600/532

(58) Field of Classification Search ............... 340/576, 340/7.5; 422/84; 73/23.3
See application file for complete search history.

(56) References Cited

U.S. PATENT DOCUMENTS

| | | | |
|---|---|---|---|
| 7,019,641 B1 | 3/2006 | Lakshmanan | |
| 7,214,939 B1 | 5/2007 | Wong et al. | |
| 7,251,515 B2 | 7/2007 | Cho et al. | |
| 7,266,455 B2 | 9/2007 | Kahkoska | |
| 7,320,030 B2 | 1/2008 | Brown | |
| 7,394,392 B1 * | 7/2008 | Roe | 340/576 |
| 7,667,609 B1 * | 2/2010 | Roe | 340/576 |
| 2001/0055544 A1 | 12/2001 | Copp et al. | |
| 2003/0036685 A1 | 2/2003 | Goodman | |
| 2005/0125197 A1 | 6/2005 | Duron et al. | |
| 2006/0036366 A1 | 2/2006 | Kelly et al. | |
| 2007/0194922 A1 | 8/2007 | Nathan et al. | |

* cited by examiner

Primary Examiner — Donnie Crosland
(74) Attorney, Agent, or Firm — Kevin Roe

(57) ABSTRACT

Methods and systems using one or more expert systems to quickly assist (e.g., advise and/or rescue) persons in danger at a location (e.g., buildings, tunnels, bridges, factories, refineries, recreational areas, such as parks, golf courses, ski-slopes, public transportation vehicles, such as buses, subways, trains, planes, ships, and equivalents), to screen and selectively test the location and/or person and assist the person if danger to the person is determined. One embodiment is a method to advise a person in danger, possibly having an impairment, using one or more expert systems. A second embodiment is a method to assist people in danger, possibly having an impairment, such as chemical impairment, physical impairment, medical impairment, or emotional impairment, using one or more expert systems. A third embodiment is a system to assist a person, if the system determines a danger at a location and/or if the system determines if a person has an impairment, such as chemical impairment, physical impairment, medical impairment, or emotional impairment, using one or more expert systems.

20 Claims, 16 Drawing Sheets

EXPERT SYSTEM ASSISTANCE FOR PERSONS IN DANGER

CROSS-REFERENCE TO RELATED APPLICATIONS

This application is a continuation-in-part of a U.S. utility patent application Ser. No. 11/787,494 filed by the same inventor on Apr. 16, 2007, issued as U.S. Pat. No. 7,667,609 on Feb. 23, 2010, entitled "Expert System Rescue of Impaired Equipment Operators," which is continuation-in-part of a U.S. utility patent application Ser. No. 11/150,746, filed by the same inventor on Jun. 10, 2005, issued as U.S. Pat. No. 7,394,392, on Jul. 1, 2008, entitled "Expert System Safety Screening of Impaired Equipment Operators," which are hereby incorporated by reference.

BACKGROUND OF THE INVENTION

1. Field of the Invention

This invention relates generally to assisting (e.g., advising and/or rescuing) persons in danger at a location, and more specifically to assisting persons (possibly impaired) when their danger is determined by one or more expert systems.

2. Description of the Prior Art

People at locations (e.g., buildings, tunnels, bridges, factories, refineries, recreational areas, such as parks, golf courses, ski slopes, public transportation vehicles, such as buses, subways, trains, planes, and ships, and other large structures) in emergency situations needlessly continue to suffer many thousands of deaths and injuries each year around the world. Although devices have been devised that alert people at a location by an alarm to an unsafe condition (e.g., fire, dangerous gases such as carbon monoxide, combustion gases such as carbon dioxide, and so forth), people have generally been forced to rely on their own judgment and trial-and-error efforts in determining what their safest course of action would be in their particular location. Such dangers, particularly in relatively large locations, such as large buildings (e.g., hotels, department stores, large office buildings, and equivalents), tunnels, bridges, factories, refineries, recreational areas (such as parks, golf courses, ski-slopes, and equivalents), or public transportation vehicles (such as buses, subways, trains, airplanes, ships, and equivalents), may require extremely prompt choices by the people in determining their safest course of action in such an emergency situation, such as a fire, explosion, violent attack, dangerous gas release, flooding, avalanche, lightning, hurricane, tornado, tsunami, earthquake, volcanic eruption, medical emergency, or other unexpected emergency. There may not be enough time for trial-and-error attempts by people to move to a safer location if their first choice of action turns out to be a mistake because of their limited knowledge of the relative levels of safety available at various areas of the location. Such mistakes are more likely to be fatal mistakes in relatively large locations, especially for visitors lacking thorough familiarity with the location (e.g., first-time hotel guests, department store shoppers, first-time or casual visitors, recreational visitors, customers, passengers, and so forth), especially when visibility is impaired by darkness, smoke, dust, power failures, structural failures, flooding, avalanche, and other causes, or when the person already has some impairment (acquired during the danger, or pre-existing before the danger arises) that limits their response to their situation.

U.S. Pat. App. No. 2007019422 published by Nathan, et al., on Aug. 23, 2007, discloses a method and system for a building warning system. The building safe warn generally related to warning or otherwise alerting people to hazards or other conditions in the building. The warnings may be generated as a function of the position of the person in the building and/or the location of a hazard so as to facilitate safely evacuating people from the building. The location of the people may be reported to emergency response entities to facilitate person discovery and rescue. The disclosures of this patent application are hereby incorporated by reference.

U.S. Pat. App. No. 20060036366 published by Kelly, et al., on Feb. 16, 2006, discloses a system and method for providing personalized storm warnings precisely tailored automatically for a particular individual or business user's geographic location of interest, which maybe provided automatically to the individual user or business. A detailed and accurate storm track, which includes information describing storm characteristics (severe weather conditions) as well as the current location and predicted track of movement of the storm, is generated. The storm track may be generated automatically from weather radar data, such as NEXRAD data, either alone, or in combination with local live weather radar information, to provide a more accurate storm track. The disclosures of this patent application are hereby incorporated by reference.

U.S. Pat. App. No. 20050125197 published by Duron, et al., on Jun. 9, 2005, discloses a system and method for detecting and monitoring structural damages which are irreversible and which lead to inevitable collapse of a building or location. The system includes at least one accelerometer that is housed in a device that is mounted on an exterior surface outside the burn area, and within the reach of the rescue worker. The device communicates with a remote display that provides visual and/or audible signals to indicate imminent collapse at the location. Additionally, the system includes collapse detecting analysis processes for determining the likelihood of collapse. The disclosures of this patent application are hereby incorporated by reference.

U.S. Pat. App. No. 20030036685 published by Goodman, on Feb. 20, 2003, discloses a physiological signal monitoring system comprising a photoplethysmography (PPG) sensor, a processing device, and a Web site server for determining, displaying and analyzing various cardiovascular parameters. The system determines a plurality of cardiovascular indices including mean blood pressure, heart rate, body temperature, respiratory rate, and arterial compliance on the basis of signal characteristics of the systolic wave pulse and the systolic reflected wave pulse present within the digital volume pulse derived from the PPG pulse contour. The system also provides for the accurate determination of systolic and diastolic blood pressure by using a non-invasive blood pressure monitor to calibrate the relationships between arterial or digital blood pressure and characteristics of the user's digital volume pulse contour. In this way, a wide variety of cardiovascular and respiratory data can be obtained. The disclosures of this patent application are hereby incorporated by reference.

U.S. Pat. App. No. 20010055544 published by Copp, et al., on Dec. 27, 2001, discloses an electromechanical device, a "detector arm." It is useful for locating humans, either living or dead, who are trapped in a location such as a building that collapsed or was badly damaged in an earthquake, mudslide, bombing, or other disaster. This device includes an extendible mechanical arm that is equipped with a gas inlet device, a miniature video lens and light source, and preferably at least one microphone, all mounted at or near the "distal" end or tip of the detector arm. Various wires, cables, and a gas inlet hose are tied to or otherwise supported by the detector arm, allowing the wires and hose to be coupled to supporting devices, such as a video display, audio amplifier, and multi-component gas detector. The detector arm assembly is lightweight and portable, allowing a human operator to carry and maneuver it during a rescue or recovery operation inside a collapsed building or similar environment. The disclosures of this patent application are hereby incorporated by reference.

U.S. Pat. No. 7,018,641 issued to Lakshmanan, on Mar. 28, 2006, discloses a human being presence detection system that automatically determines the presence of human beings without directly attaching sensors to the human body and detects human drowsiness. The detection system characterizes the occupancy of a vehicle seat to determine the characteristics of deployment of vehicle airbags and restraints in the event of a crash/accident. The rescue of military personnel or of persons trapped under rubble, behind barriers, within a building, etc., is facilitated. In one embodiment, human beings are detected using data obtained from pressure transducers in the space of interest. The pressure signals are processed by a novel signal processing algorithm to determine the presence or absence of a human being, using information from different types of pressure transducers. The disclosures of this patent are hereby incorporated by reference.

U.S. Pat. No. 7,214,939 issued to Wong, et al., on May 8, 2007, discloses a fire detector and method for generating an alarm signal in response to a fire that uses an NDIR carbon dioxide sensor to generate an alarm signal when a signal processor receives the detector signal and a pre-selected criterion is met that is indicative of the onset of a fire based upon an analysis of the detector signal using a detection algorithm that relies upon a trending pattern of the detector signal, such as recognizing a substantial drop in the detector signal strength. The disclosures of this patent are hereby incorporated by reference.

U.S. Pat. No. 7,266,455 issued to Kahkoska, on Sep. 4, 2007, discloses a lightning detector system that monitors lightning strikes for a real-time detection and processing system. This invention provides a method of detecting and ranging lightning strikes using an inexpensive eight-bit processor with a single A/D channel and without floating point hardware. The disclosures of this patent are hereby incorporated by reference.

U.S. Pat. No. 7,251,515 issued to Cho, et al., on Jul. 31, 2007, discloses an apparatus for the measuring blood sugar levels non-invasively based on temperature measurements. Non-invasively measured blood sugar level values are obtained by a temperature measurement scheme are corrected by blood oxygen saturation and blood flow volume, thereby stabilizing the measurement data. The shape or color of control buttons for controlling the measurement are associated with the function of each button such that the buttons can be identified either visually or by touch. The disclosures of this patent are hereby incorporated by reference.

U.S. Pat. No. 7,320,030 issued to Brown on Jan. 15, 2008, discloses a remote health monitoring apparatus using scripted communications, e.g., generating a script program from a set of queries. The script program is executable by a remote apparatus that displays information and/or a set of queries to the individual through a user interface. Responses to the queries that are entered through the user interface together with individual identification information are sent from the remote apparatus to the server system across a communication network. The server system also includes an automated answering service for providing a series of questions from a stored set of questions for an individual at the remote apparatus to respond to, storing responses to each provided question in the series of questions and providing a service based on the individual's response to the questions. The disclosures of this patent are hereby incorporated by reference.

While many of the systems in the prior art cleverly and impressively attempt to alert people to dangers, such systems do not actively advise and rescue the people, depending on the condition at the location and any impairments of the people to be rescued. Furthermore, any one prior art system alone has a significant likelihood of incorrectly detecting danger when there is actually no danger (i.e., a false positive), or incorrectly missing danger when there is a real danger (i.e., a false negative). Furthermore, such prior art systems have not included means to assist (e.g., advise and/or rescue) a person who is impaired or who becomes impaired or trapped (e.g., from structural failure, fire, some type of violence, poisoning, explosions or other environmental compressions or decompressions, avalanche, lightning, hurricane, tornado, tsunami, flooding, earthquake, volcanic eruption, medical emergency, or any other dangerous event). What is needed is a system that overcomes these problems with a screening and selective testing approach to increase the probability of more quickly and correctly assisting people in danger. What is also needed is appropriate assistance when a person is already impaired at a location, either because of a pre-existing condition or as a result of a dangerous event.

SUMMARY OF THE INVENTION

The present invention overcomes the problems of the prior art by using an expert system approach to increase the probability of quickly and correctly assisting (e.g., advising and/or rescuing) people at a location (e.g., buildings, tunnels, bridges, factories, refineries, recreational areas, such as parks, golf courses, ski slopes, public transportation vehicles, such as buses, subways, trains, airplanes, ships, and other large structures). Embodiments of the invention can be implemented in numerous ways. Three aspects of the invention are described below.

A first aspect of the invention is directed to a method to assist a person in danger. The method includes screening a location or a person by an expert system to detect potential danger; selectively testing the location or the person when the screening indicates potential danger; and assisting a person if the selective testing of the location or the person indicates danger to the person.

A second aspect of the invention is directed to a method to assist a person in danger. The method includes screening of a location or a person by an expert system to detect potential danger; selectively testing the location or the person when the screening at the location or the person detects potential danger; and assisting a person if the selective testing at the location indicates the danger.

A third aspect of the invention is directed to a system to assist a person in danger. The system includes a screening module to detect potential danger to a person and selectively test the location or the person when potential danger to the person is detected, wherein the screening module includes one or more expert system modules in screening the location or the person, and an assisting module to assist a person if the selective testing at the location or the person indicates the danger.

DETAILED DESCRIPTION OF THE PREFERRED EMBODIMENT

Figure 1:
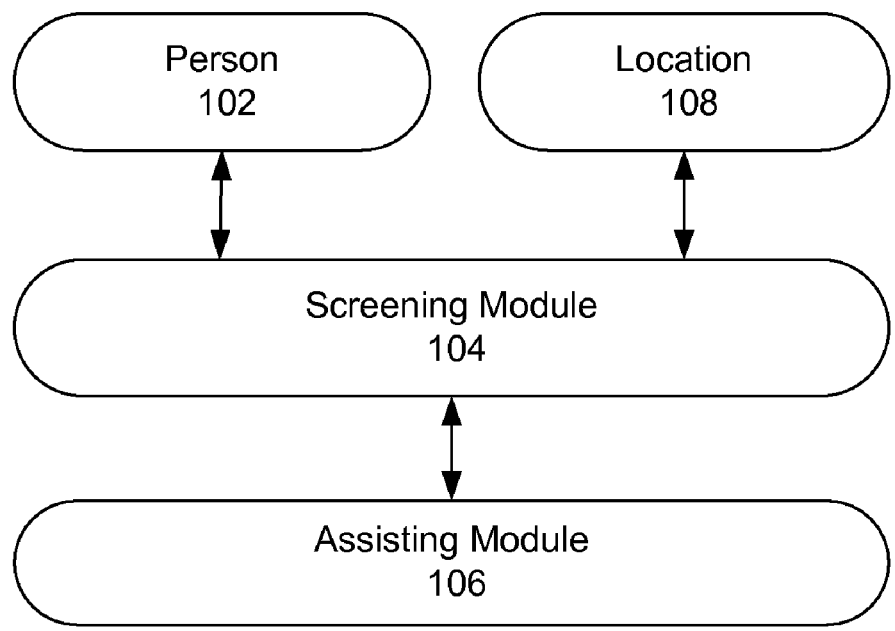
FIG. 1 illustrates a module diagram of a system to assist persons in danger, in accordance with one embodiment of the invention.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as run on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may includes, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

The primary goal of any embodiment of the present invention is to assist (e.g., advise and/or rescue) a person when there is a very high probability that there is a danger at the location and/or an impairment of the person. Furthermore, the person may already have some impairment, such as chemical impairment (e.g., alcohol impairment, chemical impairment, poisoning, or equivalent conditions), physical impairment (e.g., injury from accident, violence, or event in proximity to the person, blindness, deafness, burns, lack of air, a poisonous or disabling gas or dust, explosions or otherwise dangerous environmental decompression or compression of the body of the person, or equivalent conditions), medical impairment (e.g., shock, pain, breathing problems, stroke, heart attack, diabetic coma, exhaustion, pre-existing handicap, infectious disease, or equivalent conditions), or emotional impairment (e.g., grief, anger, psychosis, anxiety, euphoria, behavioral abnormality, or equivalent conditions). Due to the great inconvenience, any practical embodiment must have a very low probability of false positives (i.e., advising and/or rescuing the person incorrectly because of an incorrect determination of the danger at the location, and/or an incorrect determination of the person's impairment, such as chemical impairment, physical impairment, medical impairment, or emotional impairment). Furthermore, due to the great danger, any practical embodiment must also have a very low probability of false negatives (i.e., incorrectly advising a person or attempting to rescue them because of an incorrect determination of safety at the location, and/or incorrectly diagnosing a non-impairment of a person when there is a true impairment of the person). An expert system screening and selective testing at the location for danger and the person for impairment will significantly increase the accuracy of the screening and decrease both the probability of a false positive and a false negative in terms of the dangers associated with the location and/or the possible impairment of the person.

Various embodiments of the invention are possible, but one embodiment method includes measuring at least one type of chemical (e.g., ethanol, carbon monoxide, carbon dioxide, combustion by-products, hydrocarbon vapors, nitrous oxide levels, ozone levels, or any other mind-impairing chemical, poisonous gas, and equivalents) in the air in proximity to a person (e.g., in the immediate neighborhood, or within an enclosed space, such as a room, passageway, or elevator compartment), wherein the type of chemical is associated with danger and/or impairment. Selective testing at the location can proceed when at least one type of chemical is detected at a sufficient level to indicate danger at the location.

One embodiment of the invention also includes measuring at least one characteristic at the location and/or of the person that is associated with impairment, such as chemical impairment, physical impairment, medical impairment, or emotional impairment. Depending of the results of the measurement of at least one characteristic at the location and/or of the person, selective testing at the location and/or of the person can further determine whether the location is truly dangerous and/or the person is truly impaired, and based on the selective testing assist the person. The selective testing at the location can either require the active participation and knowledge of the person (e.g., asking them questions or receiving their information), or can be done without the active participation and knowledge of the person. The selective testing at the location can also increase in extent if the initial testing indicates a possible danger, such as fire, smoke, structural failure, poisonous gas release, electrical hazards, lightning, hurricane, tornado, tsunami, earthquake, flooding, avalanche, and equivalents. The selective testing of the person can either require the active participation and knowledge of the person (e.g., asking them questions or receiving their information), or can be done without the active participation and knowledge of the person. The selective testing at the location can also increase in extent if the initial testing indicates possible impairment, such as chemical impairment, physical impairment, medical impairment, or emotional impairment. The disclosures of the following patents and applications are incorporated by reference—U.S. Pat. App. No. 2007019422, U.S. Pat. App. No. 20060036366, U.S. Pat. App. No. 20050125197, U.S. Pat. App. No. 20030036685, U.S. Pat. App. No. 20010055544, U.S. Pat. No. 7,018,641, U.S. Pat. No. 7,214,939, U.S. Pat. No. 7,251,515, U.S. Pat. No. 7,266,455, and U.S. Pat. No. 7,320,030.

Embodiments of the invention can be constructed from various combinations of screening modules to selectively measure various characteristics of a location and/or a person. The screening modules can measure a characteristic at the location or the person, such as a chemical in proximity to the location or person, breathing rate of the person, blood pressure of the person, blood pulse rate of the person, blood oxygen level of the person, temperature of a portion of skin of the person, temperature of gases or objects in proximity to the location or person, one or more optical characteristics of at least one eye of the person, optical response to at least one stimulus of at least one eye of the person, at least one speech characteristic of the person, delay in response by the person to a prompt, a speed of dexterity of the person in performing at least one task, and a consistency of dexterity of the person in performing at least one task.

Embodiments of the invention can be implemented by utilizing combinations of one or more modules (e.g., using all of a module, or using a portion of a module) already existing at the location as standard features. For example, in a typical location there is an operations module (e.g., an elevator operations module allowing the person to determine one or more functions of the elevator in a structure, an equipment operating module, or equivalent), an audio module (e.g., a sound entertainment module, or a communication module) an information module (e.g., a map display module, text display module, a visitor guide module, an information kiosk, or equivalent), an security module (e.g., a motion detector module, a burglar alarm module, or equivalent), and a climate control module (e.g., an air-conditioning module, heater module, or equivalent). Many of these modules have become very sophisticated in their interfaces and in their convenience to the person. These existing modules also can provide useful information on past and/or current person actions to assist in the process of determining whether the person is truly impaired or not impaired.

There are at least eleven major advantages to using expert system screening in conjunction with already existing modules at the location to detect a danger at the location and/or a possible impairment of a person. The advantages are (1) the person is much less likely to deactivate or damage existing modules because of their fundamental convenience and utility to the person, (2) the person may be already familiar and comfortable interacting with the existing modules and less likely to avoid them, (3) the person is already knowledgeable in interacting with existing modules and therefore does not need extensive additional training to interact with an entirely new module, (4) the transducers and/or person displays are more trusted by the person even while being used for screening purposes, (5) some existing modules already have useful information about the history of the person that can improve the accuracy of the determination of impairment, (6) speech synthesis and/or speech recognition systems in the existing modules can be utilized in the screening of the person to determine impairment, or in obtaining information about any emergency at the location from the person, (7) use of existing modules greatly reduces the screening cost, (8) overall reliability is increased, since the use of existing modules reduces the total complexity and probability of failure of the components needed for a safety and/or impairment screening, (9) less space is needed at the location, (10) less electrical power is needed to conduct the screening and selective testing of the location and/or the person, and (11) the screening and testing can be accurately performed in a very short time (e.g., as quickly as a few seconds, depending on the complexity and needs of the situation) by skipping much slower types of screening and testing (e.g., extensive statistical evaluations, repeated tests and evaluations, and so forth).

Embodiments of the invention can be constructed using one or more data processing systems already existing in the modules listed above, in a time-sharing allocation of their available processors and memory. Such existing modules frequently have some unused memory and considerable unused processor time available after performing their existing module functions. Alternatively, one or more additional data processing systems (e.g., based on any commercially available microprocessor of any word bit width and clock speed, a control Read-Only-Memory, or a data processing equivalent) can be dedicated to combining the information gathered from one or more modules listed above, or equivalent modules.

One embodiment of the invention uses one or more expert system modules to screen and test a location to determine whether or not there is a true danger and advise and rescue people depending on their impairment. Such expert system modules can be executed in one or more dedicated data processing systems, and/or executed in a time-sharing allocation on one or more of the processors already existing in one or more of the modules listed above (e.g., operations module, audio module, information module, security module, climate control module, or an equivalent module normally associated with the mechanisms existing at the location).

One embodiment of the invention also utilizes one or more expert system modules to screen and selectively test a location and advise and rescue people by one or more interactions and evaluate the responses of a person to the interactions to determine whether or not there is a true danger to the person at the location and/or whether the person is impaired. These interactions can include question and answer exchanges, sound exchanges, visual exchanges, and/or physical exchanges. Question and answer exchanges could be about the location or the person, initiated by the invention or by the person. A sound exchange includes one or more types of speech, hearing, and/or sound games to evaluate the person. In certain embodiments, the person can directly and verbally request testing at the location and/or advice and/or rescue (e.g., when the person is suddenly injured or otherwise impaired, and so forth). A visual exchange includes one or more types of visual displays (e.g., flat panel displays, touchscreen displays, and equivalents) or games to evaluate the person using one or more displays. A physical exchange includes one or more types of dexterity games to evaluate the person. One or more of these evaluations can be used to adapt or perform the screening and/or selective testing at the location and/or the person to more quickly and more accurately determine whether there is a true danger at the location and/or determine whether the person has a true impairment.

One embodiment of the invention also includes a screening module that permits screening and/or selective testing of a location and/or a person upon activation by one or more sensors at the location and/or by the person and/or one or more people in proximity to the location or the person. In one embodiment, a rescue team could interact with the invention in order to determine the location and condition of a person at the location. In one embodiment, the person and/or one or more people in proximity to the location or person can verbally or physically activate a screening of the person for impairment by one or more expert systems. In certain embodiments, the screening module can be activated by events likely to lead to danger at the location (e.g., fire, unusual gases, explosion inside or outside the location, hurricane, tornado, lightning, sounds associated with violence, tsunami, earthquake, volcanic eruption, floods, avalanches, and so forth).

One embodiment of the invention also includes selective testing that selectively changes according to one or more other factors, such as air temperature, oxygen levels, carbon dioxide levels, carbon monoxide levels, combustion by-product levels, nitrous oxide levels, ozone levels, hydrocarbon vapor levels, the presence of any gas associated with danger, air humidity, air pressure, explosions or other environmental compressions or decompressions, voice loudness levels, structural failures, fire, flooding, lightning, hurricane, tornado, avalanches, tsunami, earthquake, or volcanic eruption. In other words, one embodiment of the invention can screen the location and/or the person for selective testing to determine a danger at the location and/or an impairment of the person.

Assisting (e.g., advising and/or rescuing) a person can include many possible types of responses. Assisting the person (when feasible) can include one or more of the following responses: advising the person of the safest or a safer evacuation route, advising them of a second location having less danger or having emergency supplies, shielding the person from additional harm by activating mechanisms (e.g., using polymer shields, metal shields, Kevlar shields, ceramic shields, airbags, sprays, or foams to avert projectiles, explosions, lightning, fires, gases, heat, light, and so forth), changing the posture of a person (e.g., to improve blood flow to alleviate shock or bleeding, or to make them less likely to be injured), supplying medical drugs (e.g., antidotes, analgesics, anti-inflammatory drugs, and so forth) by injection (e.g., needle, transfusion, and so forth), inhalation (e.g., releasing various medically appropriate gases in proximity to the person, depending on their medical condition), or ingestion (e.g., pills or liquids), or using or providing other medical aid (e.g., cardiac defibrillator, mask, bandages, gels, foams, liquids, and so forth) to the person, performing appropriate and feasible medical treatment (e.g., assistive respiration by selective compressions, assistive heart stimulation by electrical impulses through a defibrillator, and so forth) on the person, providing food or water, decreasing or increasing air temperature in proximity to the impaired (e.g., decreasing temperature to counteract heat from fire or explosion, or increasing temperature to counteract medical shock or cold from a significant breach of a compartment), increasing or decreasing the supply of appropriate gases (e.g., oxygen, nitrogen, nitrous oxides, carbon dioxide, halon gases or other fire-suppression gases, foams, gels, or liquids in the event of fire or explosion, or other gases) in proximity to the person, sending a warning message to summon medical assistance (e.g., to ambulances, hospitals, and so forth) and/or providing more specific person location and condition information to rescue teams, contacting other entities (e.g., military, police, other government agencies, and so forth), activating a radio beacon, assuring the person of one or more remedial actions, and/or speaking to the person to minimize their panic, terror or anxiety. In one embodiment of the invention, rescue of a person includes one or more of the following actions: disabling equipment at the location, disabling the equipment at the location after a time delay, temporarily disabling the equipment at the location for a pre-selected time duration, shutting off power to the equipment at the location, limiting operation of said equipment at the location to a lower speed of operation, limiting the operation of the equipment at the location to allow only return of the equipment at the location to a pre-selected state or a pre-selected location, autonomously opening, closing, adjusting, activating, or de-energizing (e.g., cutting-off electricity) to a portion at the location (e.g., by radio signals, optical signals, or wire signals, separately or in combination, or an equivalent means), denying entry to dangerous areas at the location, activating an alarm, and/or sending a warning message to another entity for assistance (e.g., by radio, email, telephone, or an equivalent).

FIG. 1 illustrates a module diagram of a system to assist persons in danger, in accordance with one embodiment of the invention. The screening module 104 screens the location 108 for at least one type of danger and/or screens the person 102 to determine at least one type of potential impairment. In one embodiment, the screening module 104 includes one or more test systems disclosed in the prior art (computerized or non-computerized) or commercially available to screen, measure, or test humans or environments for dangerous phenomena. Various sensors and transducers (e.g., thermometers, chemical sensors, pressure sensors, gas sensors, electrical sensors, sound sensors, electromagnetic wave sensors, radiation sensors, light sensors, accelerometers, spectrometers, visible light cameras, infrared cameras, or equivalent equipment) can be used to screen or test a location or a person. In one embodiment, the screening module 104 includes part or all of one or more of the detection systems taught in any of the prior art patents that have been previously listed and incorporated by reference in this application or its parent application. The screening module 104 determines whether the location 108 is dangerous and/or if the person 102 is impaired and whether to activate various features of the assisting module 106. Assisting module 106 advises and/or rescues the person and may utilize one or more mechanisms existing at the location 108, using one or more of the assist responses already listed above. For example, in one embodiment the assisting module 106 interacts with the location 108 without delay. In certain embodiments, the assisting module 106 includes one or more automated mechanisms for implementing rescue (e.g., feedback circuits, solenoids, or equivalents) and microprocessors, micro-controllers, or other types of data processing systems to control the automated mechanisms.

Figure 2:
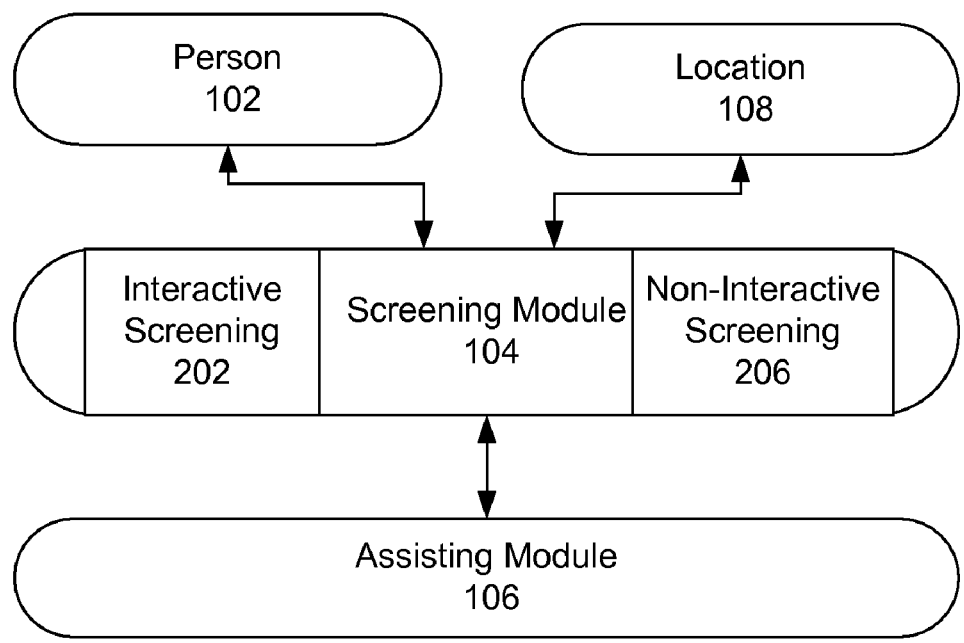
FIG. 2 illustrates a module diagram of a system to assist persons in danger, in accordance with another embodiment of the invention.

FIG. 2 illustrates a module diagram of a system to assist persons in danger, in accordance with one embodiment of the invention. The screening module 104 screens the location 108 for at least one type of danger and/or screens the person 102 for one or more impairments, such as chemical impairment, physical impairment, medical impairment, or emotional impairment. The screening module 104 determines whether the location 108 is dangerous and/or the person 102 is impaired and whether to activate various features of the assisting module 106. Assisting module 106 advises and/or rescues the person and may utilize one or more mechanisms existing at the location 108, using one or more of the assist responses listed above. In this embodiment of the invention, screening module 104 includes both an interactive screening module 202 (which will screen the location 108 and/or the person 102 with the conscious interaction and awareness of the person 102) and non-interactive screening module 206 (which will screen the location 108 and/or the person 102 without the conscious interaction and awareness of the person 102).

Non-interactive screening module 206 can measure a characteristic at the location 108 and/or the person 102, such as a chemical in proximity to the person, breathing rate of the person, blood pressure of the person, blood pulse rate of the person, blood oxygen level of the person, blood sugar level of the person, temperature of a portion of skin of the person, one or more optical characteristics of at least one eye of the person, optical response to at least one stimulus of at least one eye of the person, at least one speech characteristic of the person, delay in response by the person to a prompt, a speed of dexterity of the person in performing at least one task, and a consistency of dexterity of the person in performing at least one task. Interactive screening module 202 can incorporate one or more features of the non-interactive screening module 206 and also ask the person 102 about the conditions of the location 108 and/or person 102, ask the person 102 to perform some task, such as speaking, interpreting a visual pattern, or physically moving some body part (e.g., hands or fingers).

One or both of the interactive screening module 202 and non-interactive screening module 206 can also access other relevant data to consider with the screening results in determining whether there is a true danger at the location and/or a true impairment of the person. Other factors data can include one or more factors, such as air temperature, oxygen levels, carbon dioxide levels, carbon monoxide levels, combustion by-products, nitrous oxide levels, ozone levels, hydrocarbon vapor levels, the presence of any gas associated with impairment, air humidity, air pressure, noises, sound loudness levels in proximity to the modules existing at the location, explosions or other environmental compressions or decompressions, fires, flooding, avalanche, lightning, hurricane, tornado, tsunami, earthquake, volcanic eruption, and/or a history at the location.

Figure 3:
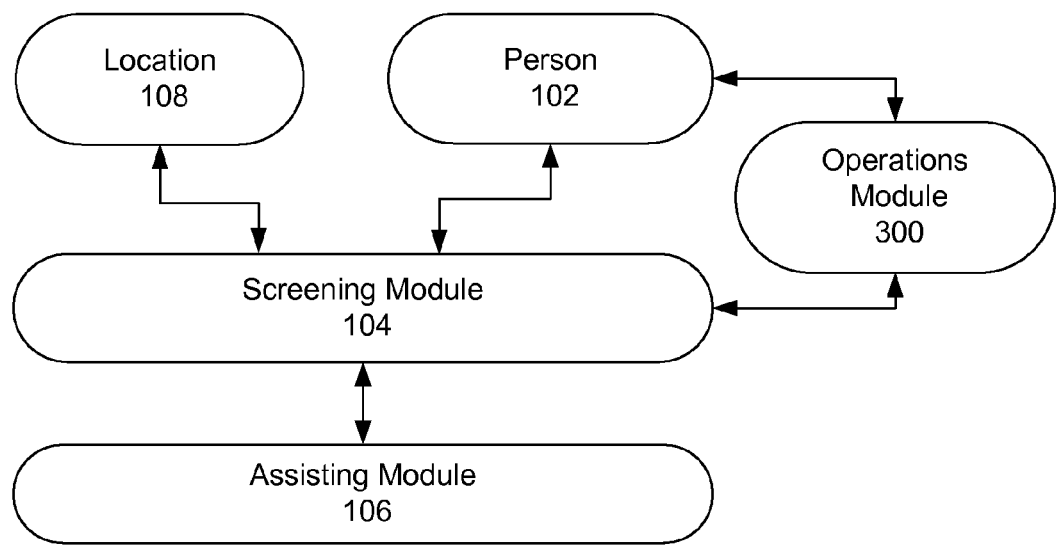
FIG. 3 illustrates a module diagram of a system to assist people by utilizing an operations module at the location, in accordance with another embodiment of the invention.

FIG. 3 illustrates a module diagram of a system to assist people by utilizing an operations module at the location, in accordance with another embodiment of the invention shown in FIG. 1. The screening module 104 screens the location 108 for at least one type of danger and/or screens the person 102 for one or more impairments. The screening module 104 utilizes information from operations module 300 to determine whether the location 108 is dangerous and/or the person 102 is impaired and whether to activate various features of the assisting module 106. Assisting module 106 advises and/or rescues the person and may utilize one or more mechanisms existing at the location 108, using one or more of the responses listed above. The operations module 300 in some embodiments includes speech synthesis and/or speech recognition subsystems that can be integrated with little additional cost with the screening module 104 to expand the extent of the screening to include speech communication and speech analysis of the person 102. The operations module 300 in one embodiment also provides historical information useful for more accurately screening the location 108 for danger and the person 102 for impairments.

Figure 4:
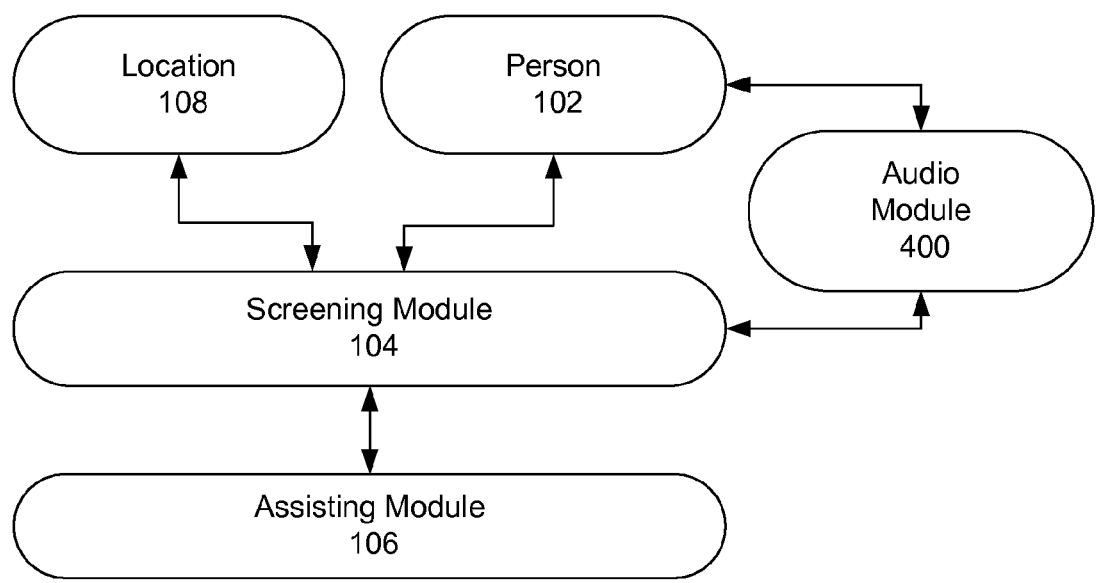
FIG. 4 illustrates a module diagram of a system to assist people by utilizing an audio module at the location, in accordance with another embodiment of the invention.

FIG. 4 illustrates a module diagram of a system to assist people by utilizing an audio module at the location, in accordance with another embodiment of the invention shown in FIG. 1. The screening module 104 screens the location 108 for at least one danger and screens the person 102 for one or more impairments. The screening module 104 utilizes information from audio module 400 to determine whether the location 108 is dangerous and/or the person 102 is impaired and whether to activate various features of the assisting module 106. Assisting module 106 advises and/or rescues the person and may utilize one or more mechanisms existing at the location 108, using one or more of the assisting responses listed above. The audio module 400 in some embodiments includes speech synthesis and/or speech recognition subsystems that can be integrated with little additional cost with the screening module 104 to expand the extent of the screening to include speech communication and speech analysis of the person 102. The audio module 400 in one embodiment also provides historical information useful for more accurately screening the location 108 for danger and the person 102 for impairments.

Figure 5:
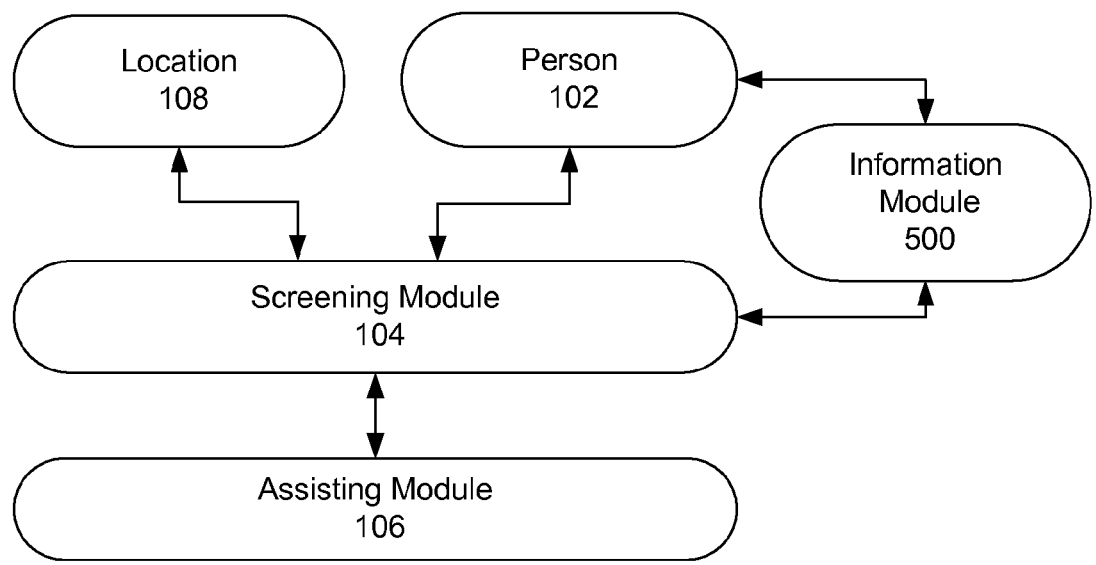
FIG. 5 illustrates a module diagram of a system to assist people by utilizing an information module at the location, in accordance with another embodiment of the invention.

FIG. 5 illustrates a module diagram of a system to assist people by utilizing an information module at the location, in accordance with another embodiment of the invention shown in FIG. 1. The screening module 104 screens the location 108 for danger and screens the person 102 for one or more impairments. The screening module 104 utilizes information from the information module 500 to determine whether the location 108 is dangerous and/or the person 102 is impaired and whether to activate various features of the assisting module 106. Assisting module 106 advises and/or rescues the person and may utilize one or more mechanisms existing at the location 108, using one or more of the assisting responses listed above. The information module 500 in some embodiments includes speech synthesis and/or speech recognition subsystems that can be integrated with little additional cost with the screening module 104 to expand the extent of the screening to include speech communication and speech analysis of the person 102. The information module 500 in one embodiment also provides historical information useful for more accurately screening the location 108 for danger and screening the person 102 for impairments.

Figure 6:
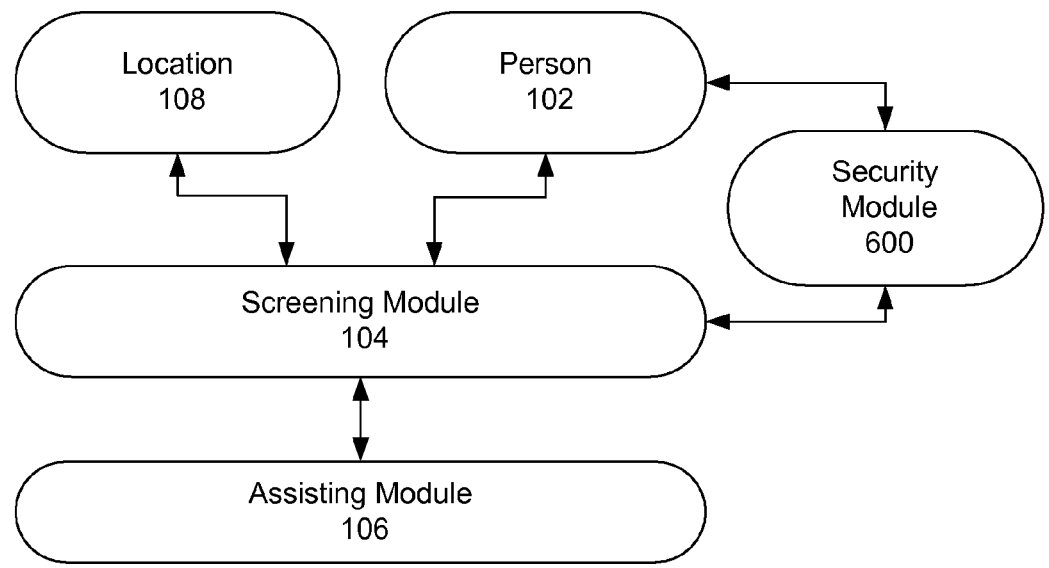
FIG. 6 illustrates a module diagram of a system to assist people by utilizing an security module at the location, in accordance with another embodiment of the invention.

FIG. 6 illustrates a module diagram of a system to assist people by utilizing an security module at the location, in accordance with another embodiment of the invention shown in FIG. 1. The screening module 104 screens the location 108 for danger and screens the person 102 for one or more impairments. The screening module 104 utilizes information from the security module 600 to determine whether the location 108 is dangerous and/or the person 102 is impaired and whether to activate various features of the assisting module 106. Assisting module 106 advises and/or rescues the person and may utilize one or more mechanisms existing at the location 108, using one or more of the assisting responses listed above. The security module 600 in some embodiments includes speech synthesis and/or speech recognition subsystems that can be integrated with little additional cost with the screening module 104 to expand the extent of the screening to include speech communication and speech analysis of the person 102. The security module 600 in one embodiment also provides historical information useful for more accurately screening the location 108 for dangers and screening the person 102 for impairments.

Figure 7:
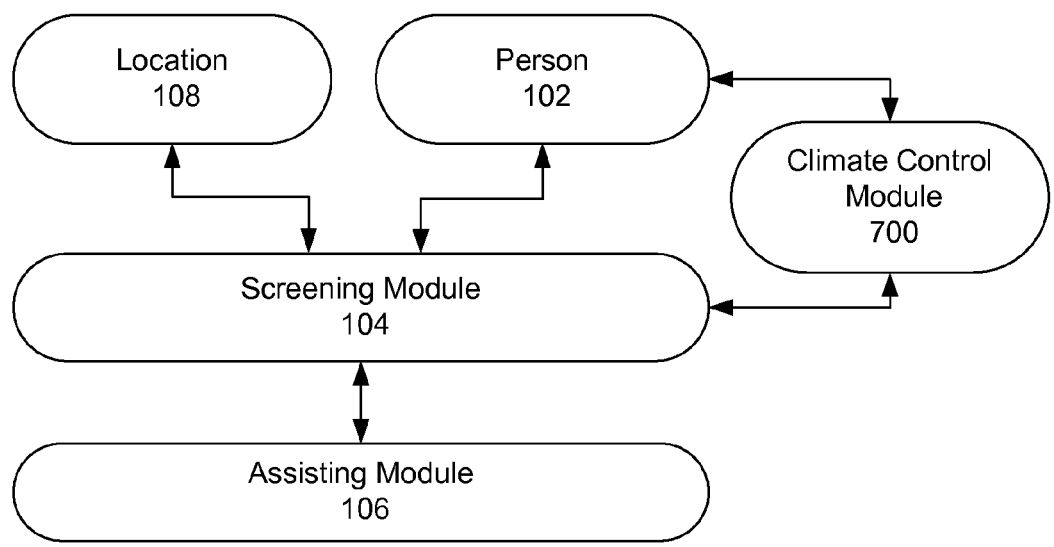
FIG. 7 illustrates a module diagram of a system to assist people by utilizing a climate control module at the location, in accordance with another embodiment of the invention.

FIG. 7 illustrates a module diagram of a system to assist people by utilizing a climate control module at the location, in accordance with another embodiment of the invention shown in FIG. 1. The screening module 104 screens the location 108 for at least one danger and screens the person 102 for one or more impairments. The screening module 104 utilizes information from the climate control module 700 to determine whether the location 108 is dangerous and/or the person 102 is impaired and whether to activate various features of the assisting module 106. Assisting module 106 advises and/or rescues the person and may utilize one or more mechanisms existing at the location 108, using one or more of the assisting responses listed above. The climate control module 700 in some embodiments includes speech synthesis and/or speech recognition subsystems that can be integrated with little additional cost with the screening module 104 to expand the extent of the screening to include speech communication and speech analysis of the person 102. The climate control module 700 in one embodiment also provides historical information useful for more accurately screening the location 108 for danger and screening the person 102 for impairments.

Figure 8:
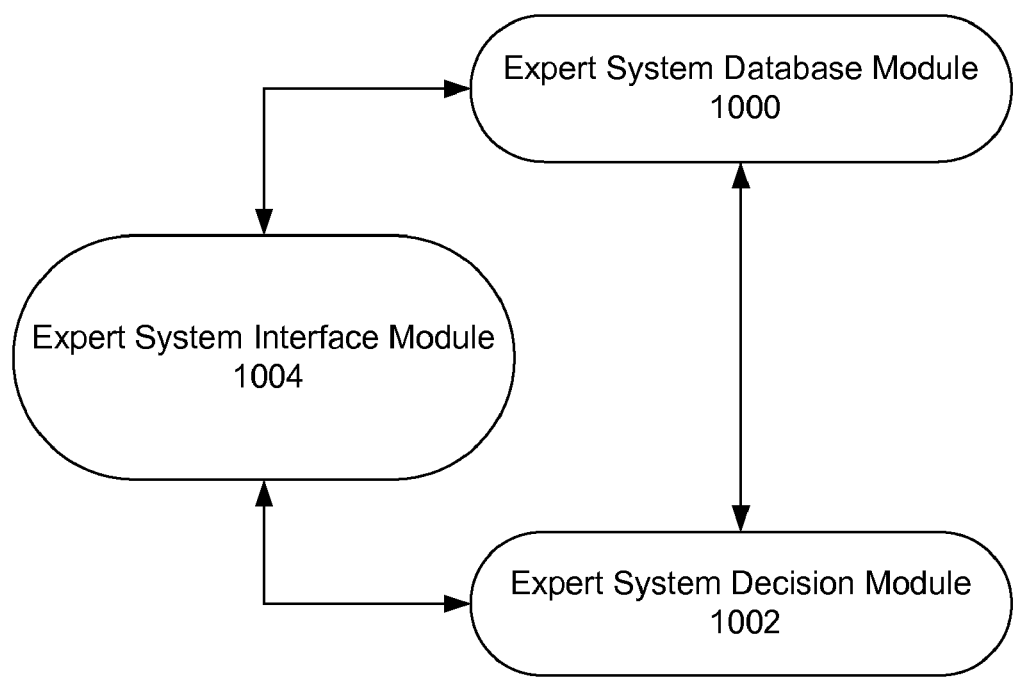
FIG. 8 illustrates an expert system implementation of the screening module shown in FIG. 1 to assist persons in danger, in accordance with another embodiment of the invention.

FIG. 8 illustrates an expert system implementation of the screening module 104 shown in FIG. 1 to assist persons in danger, in accordance with another embodiment of the invention. The expert system database module 1000 communicates with the expert system decision module 1002 and the expert system interface module 1004. The expert system database module 1000 stores information useful in determining at least one danger at the location (not shown) and/or determining at least one impairment of the person (not shown). The expert system decision module 1002 makes the actual determination of whether or not the location is dangerous and/or whether a person is impaired and decides which various features of the rescue response to make if there is a danger at the location or an impairment of the person. The expert system interface module 1004 obtains information concerning the location and/or person to determine whether or not the location is dangerous and/or the person has a true impairment. The information concerning the person can be obtained from measuring a characteristic of the person, such as a chemical in proximity to the person, breathing rate of the person, blood pressure of the person, blood pulse rate of the person, blood oxygen level of the person, temperature of a portion of skin of the person, one or more optical characteristics of at least one eye of the person, optical response to at least one stimulus of at least one eye of the person, at least one speech characteristic of the person, delay in response by the person to a prompt, a speed of dexterity of the person in performing at least one task, a consistency of dexterity of the person in performing at least one task, asking the person about the conditions at the location or the person, asking the person to perform some task, such as speaking, interpreting a visual pattern, or physically moving some body part (e.g., hands or fingers).

Figure 9:
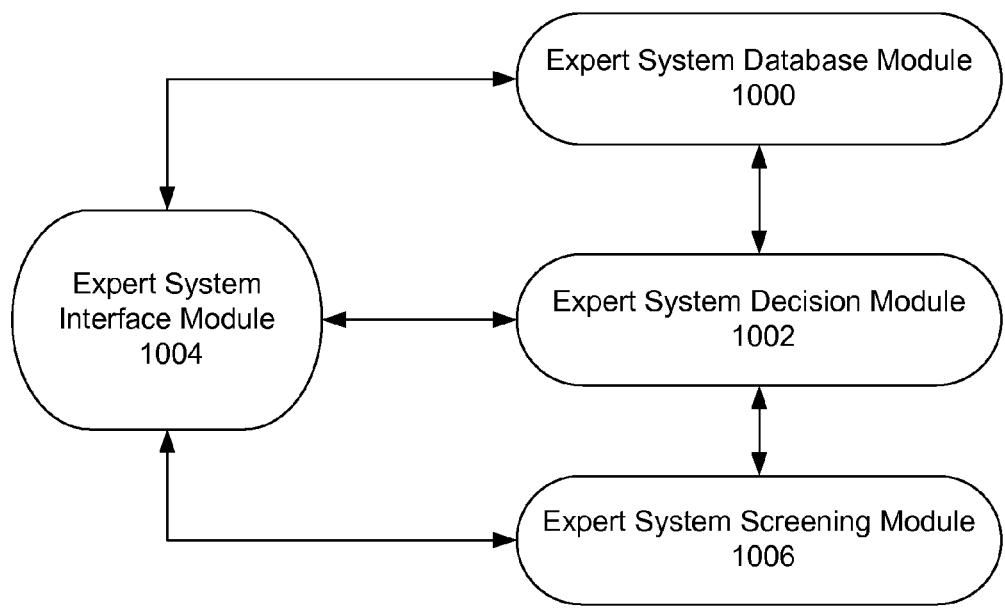
FIG. 9 illustrates an expert system implementation of the screening module shown in FIG. 1 to assist persons in danger, in accordance with another embodiment of the invention.

FIG. 9 illustrates an expert system implementation of the screening module 104 shown in FIG. 1 to assist persons in danger, in accordance with another embodiment of the invention. The expert system database module 1000 communicates with the expert system decision module 1002 and the expert systems interface module 1004. The expert system screening module 1006 communicates with the expert system decision module 1002 and the expert system interface module 1004. The expert system database module 1000 stores information useful in determining the danger at the location (not shown) and/or determining one or more impairments of the person. The expert system decision module 1002 makes the actual determination of whether or not the location is dangerous and/or whether the person is impaired and decides which features of the advise or control response to make if there is danger and/or an impairment. The expert system screening module 1006 assists in screening and selectively testing the location and/or the person, and assists the expert system decision module 1002 in determining whether the location is dangerous and/or whether the person has at least one true impairment. The expert system interface module 1004 is used to obtain information concerning the location and person to determine whether or not the location is dangerous and/or the person has at least one true impairment. The expert system other factors module 1008 communicates with the expert system screening module 1006 and the expert system interface module 1004, and provides additional information that is used to adapt and/or interpret the screening at the location and/or the person to more accurately determine whether the location is truly dangerous and/or whether the person has at least one true impairment.

Figure 10:
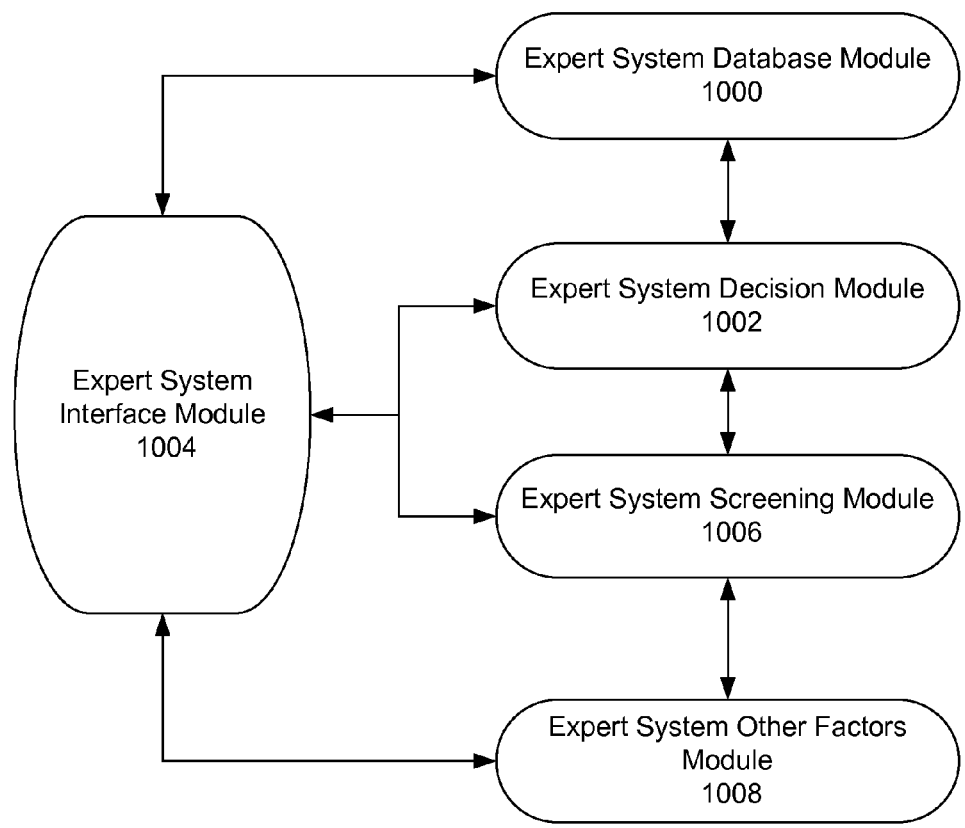
FIG. 10 illustrates an expert system implementation of the screening module shown in FIG. 1 to assist persons in danger, in accordance with another embodiment of the invention.

FIG. 10 illustrates an expert system implementation of the screening module 104 shown in FIG. 1 to assist persons in danger, in accordance with another embodiment of the invention. The expert system database module 1000 communicates with the expert system decision module 1002 and the expert system interface module 1004. In this embodiment, the expert system interface module 1004 resides within one or more existing modules previously listed (e.g., an operations module, an audio module, an information module, an security module, a climate control module, or an equivalent module normally associated with the mechanisms existing at the location).

Figure 11:
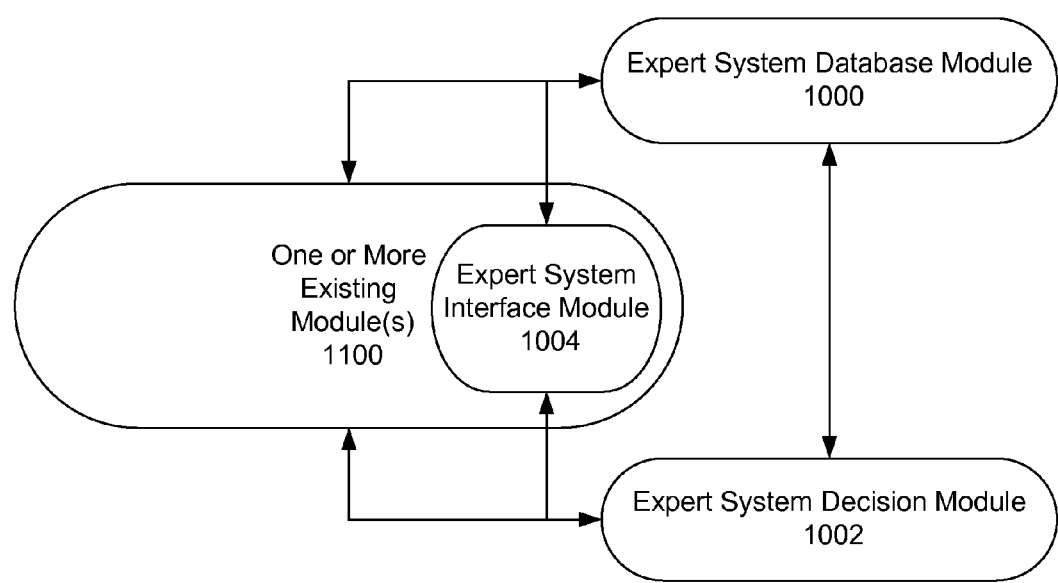
FIG. 11 illustrates an expert system implementation of the screening module shown in FIG. 1 to assist persons in danger, in accordance with another embodiment of the invention.

FIG. 11 illustrates an expert system implementation of the screening module 104 shown in FIG. 1 to assist persons in danger, in accordance with another embodiment of the invention. The expert system database module 1000 communicates with the expert system decision module 1002 and the expert system interface module 1004. In this embodiment, the expert system interface module 1004 resides within one or more existing modules 1100 previously listed (e.g., an operations module, an audio module, an information module, an security module, a climate control module, or an equivalent module normally associated with the mechanisms existing at the location). For example, in one embodiment the expert system interface module 1004 resides within an operations module at the location. In another embodiment the expert system interface module 1004 resides within an audio module at the location. In another embodiment the expert system interface module 1004 resides within an information module at the location.

Figure 12:
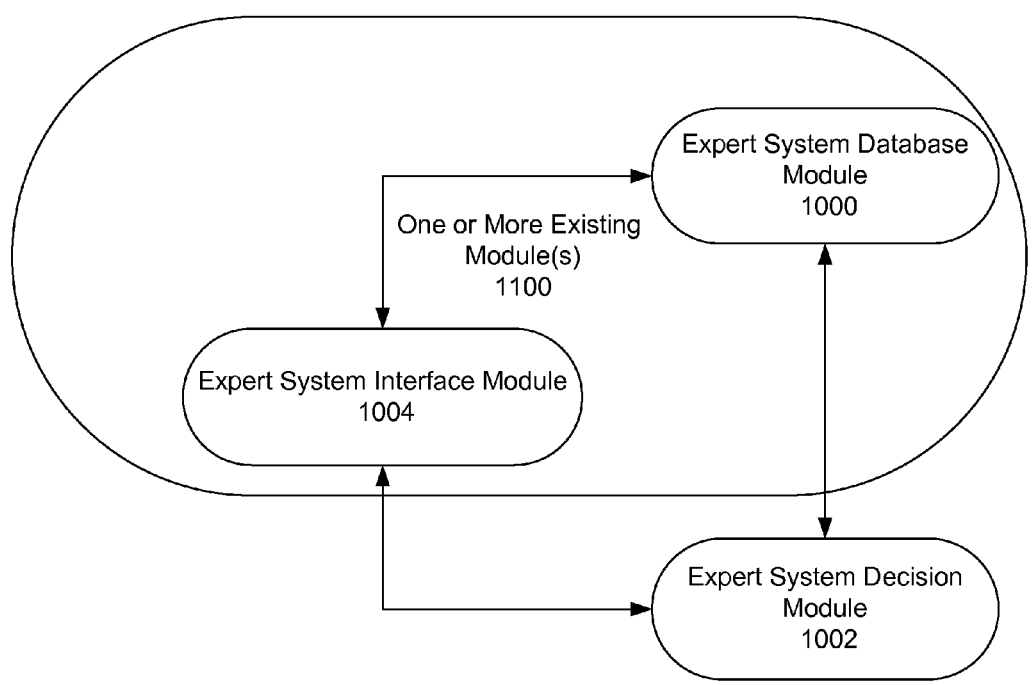
FIG. 12 illustrates an expert system implementation of the screening module shown in FIG. 1 to assist persons in danger, in accordance with another embodiment of the invention.

FIG. 12 illustrates an expert system implementation of the screening module 104 shown in FIG. 1 to assist persons in danger, in accordance with another embodiment of the invention. The expert system database module 1000 communicates with the expert system decision module 1002 and the expert system interface module 1004. In this embodiment, the expert system database module 1000 and the expert system interface module 1004 reside within one or more existing modules 1100 previously listed (e.g., an operations module, an audio module, an information module, an security module, a climate control module, or an equivalent module normally associated with the mechanisms existing at the location). For example, in one embodiment the expert system database module 1000 and the expert system interface module 1004 reside within the same operations module at the location. In another embodiment the expert system database module 1000 resides in an operations module, and the expert system interface module 1004 resides within an audio module. In another embodiment the expert system database module 1000 resides in an information module, and the expert system interface module 1004 resides within an operations module.

Figure 13:
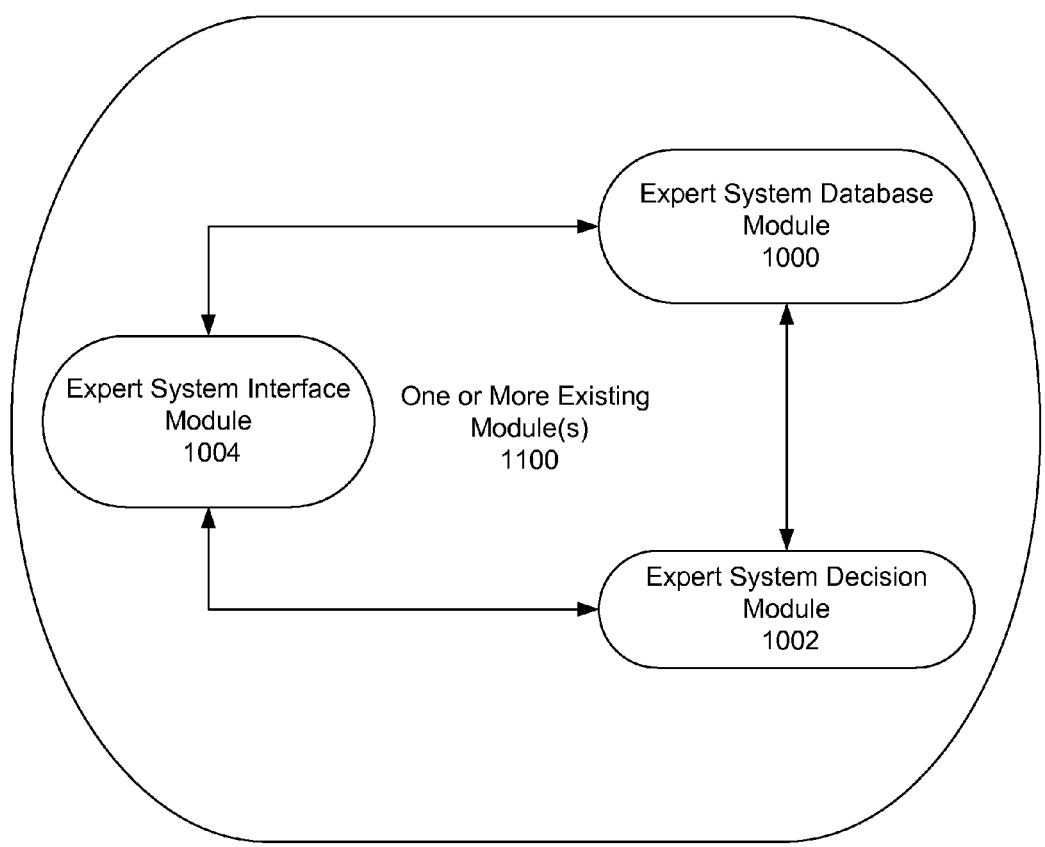
FIG. 13 illustrates an expert system implementation of the screening module shown in FIG. 1 to assist persons in danger, in accordance with another embodiment of the invention.

FIG. 13 illustrates an expert system implementation of the screening module 104 shown in FIG. 1 to assist persons in danger, in accordance with another embodiment of the invention. The expert system database module 1000 communicates with the expert system decision module 1002 and the expert system interface module 1004. In this embodiment, the expert system database module 1000, the expert system decision module 1002, and the expert system interface module 1004 reside within one or more existing modules 1100 previously listed (e.g., an operations module, an audio module, an information module, an security module, a climate control module, or an equivalent module normally associated with the mechanisms existing at the location). For example, in one embodiment the expert system database module 1000, the expert system decision module 1002, and the expert system interface module 1004 all reside within the same existing modules at the location chosen from the previous list. In another embodiment the three expert system modules are spread among multiple existing modules. Less cabling and a faster response time are two advantages in locating the expert system database module 1000, the expert system decision module 1002, and the expert system interface module 1004 within the same existing module at the location. However, there may not be enough available processor time and memory in one existing module at the location to support the entire expert system. Furthermore, in one embodiment, the screening module 104 shown in FIG. 1 is actually composed of one or more expert systems for determining different types of location dangers and/or person impairments, and portions of each expert system can be consolidated or distributed among one or more existing modules previously listed. In certain embodiments, it may actually be an advantage to have redundancy in the expert system(s) by installing one or more systems in more than one module in the event of severe damage to the mechanisms existing at the location from some event (e.g., fire, explosion, flooding, avalanche, lightning, structural failure, act of violence, earthquake, tornado, hurricane, tsunami, or volcanic eruption). In one embodiment, triple module redundancy (well-known in the prior art of fault tolerant computer technology), where at least two out of three modules must agree on a correct result before the result is relied upon, can be implemented in cases where at least one module may likely be damaged or disabled by some dangerous event, either natural or man-made.

Figure 14:
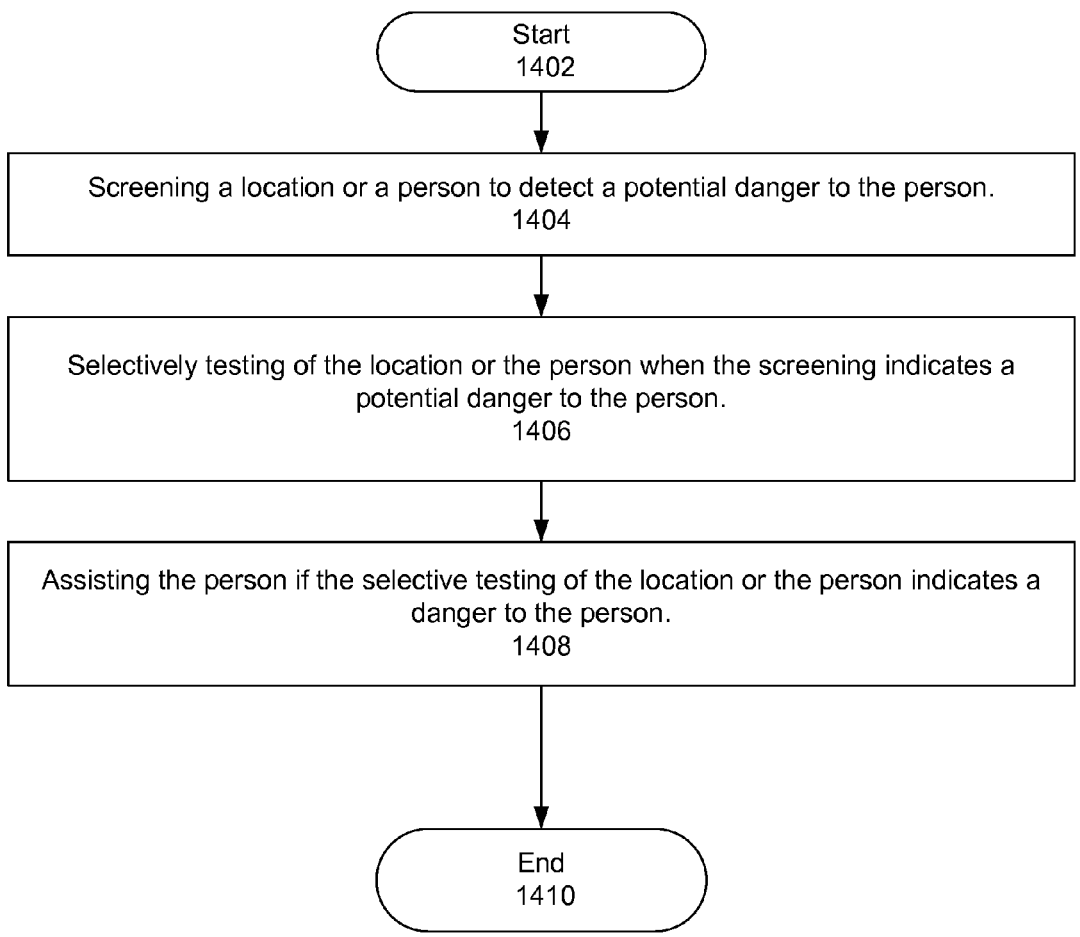
FIG. 14 illustrates a flowchart of a method to assist persons in danger, in accordance with another embodiment of the invention.

FIG. 14 illustrates a flowchart of a method to assist persons in danger, in accordance with another embodiment of the invention. The method starts in operation 1402. Operation 1404 is next and includes screening a location or a person to detect potential danger to the person. Operation 1406 is next and includes selectively testing the location and/or the person when the screening indicates potential danger to the person. Operation 1408 is next and includes assisting the person if the selective testing at the location indicates a danger to the person. Assisting the person can include one or more of the following responses previously disclosed in more detail above: advising the person, shielding the person from additional harm, supplying medical drugs or other medical aid to the person, performing medical treatment on the person, increasing or decreasing air temperature in proximity to the person, increasing or decreasing the supply of appropriate gases in proximity to the person, sending a warning message to summon medical assistance, contacting other entities, activating a radio beacon, assuring the person of one or more remedial actions, and issuing a warning message to the person. The method ends in operation 1410.

Figure 15:
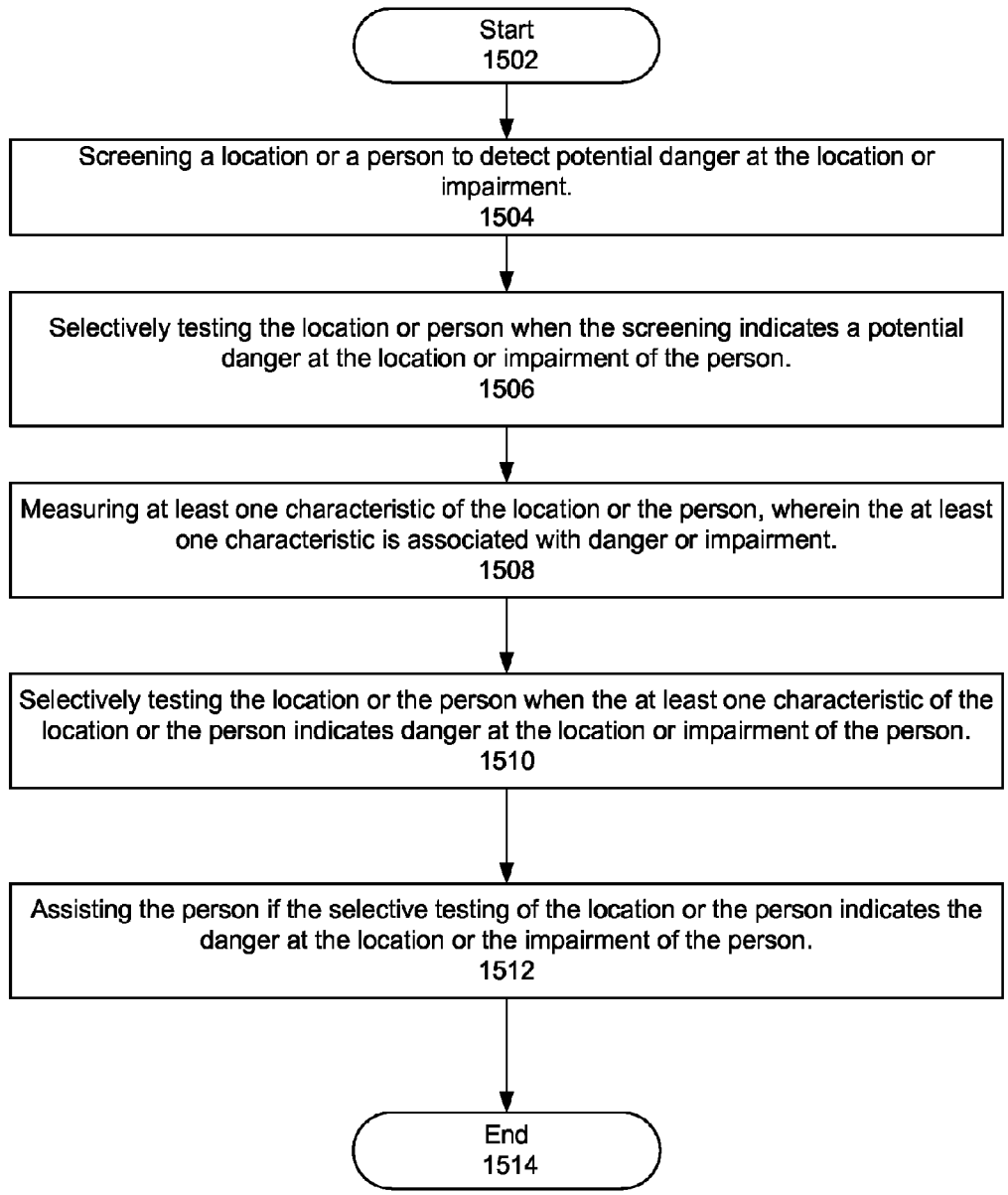
FIG. 15 illustrates a flowchart of a method to assist persons in danger, in accordance with another embodiment of the invention.

FIG. 15 illustrates a flowchart of a method to assist persons in danger, in accordance with one embodiment of the invention. The method starts in operation 1502. Operation 1504 is next and includes screening the location for danger and/or screening a person to detect potential impairment. Operation 1506 is next and includes selectively testing the location and/or the person when the screening indicates potential danger at the location and/or impairment of the person. Operation 1508 is next and includes measuring at least one characteristic at the location and/or the person, wherein the at least one characteristic is associated with danger and/or impairment. Operation 1510 is next and includes selectively testing the location and/or the person when at least one characteristic at the location and/or the person indicates the danger at the location and/or impairment of the person. Operation 1512 is next and includes assisting the person if the selective testing at the location indicates the danger at the location and/or impairment of the person. The assisting operation can include one or more of the assisting responses listed above. The method ends in operation 1514.

Figure 16:
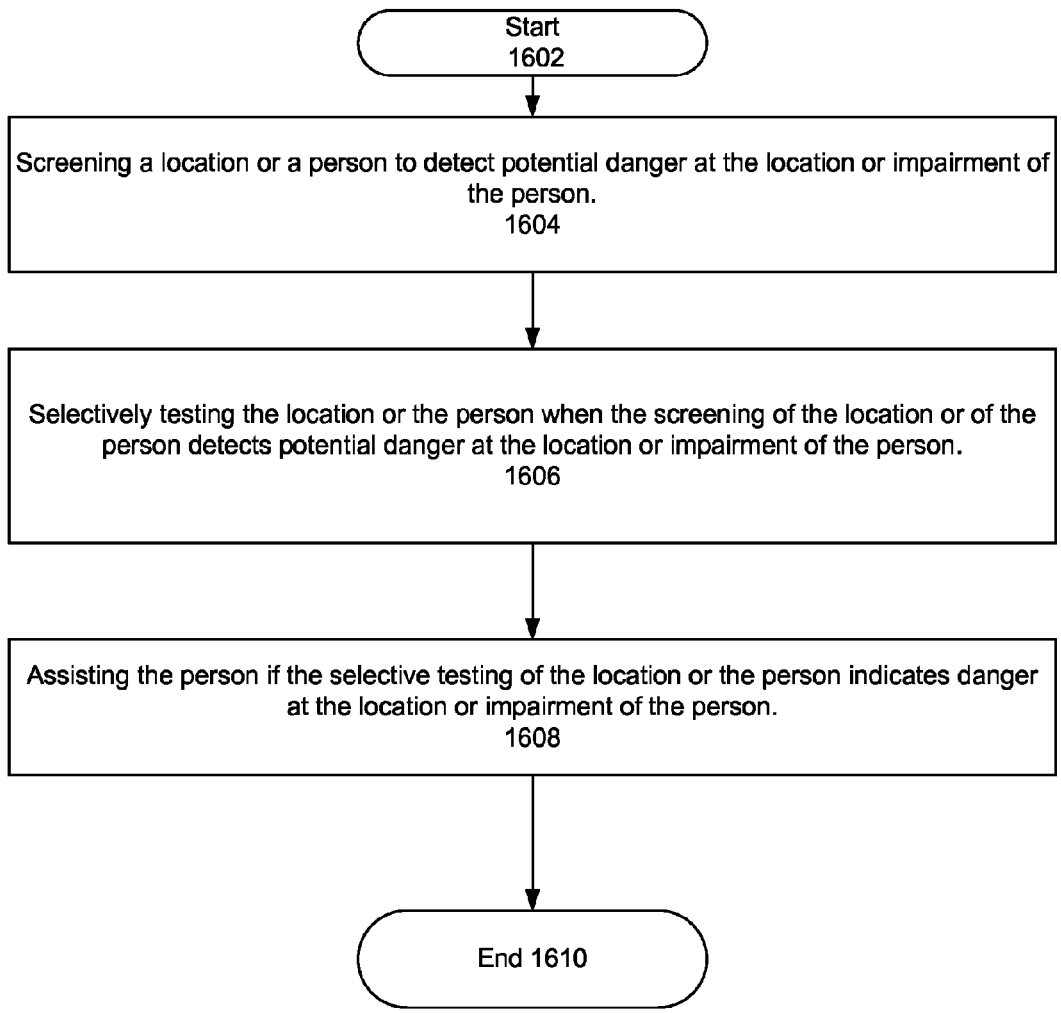
FIG. 16 illustrates another flowchart of a method to assist persons in danger, in accordance with another embodiment of the invention.

FIG. 16 illustrates another flowchart of a method to assist persons in danger, in accordance with one embodiment of the invention. The method starts in operation 1602. Operation 1604 is next and includes screening a location and/or a person to detect potential danger at the location and/or impairment of the person. Operation 1606 is next and includes selectively testing the location and/or the person when the screening at the location and/or person detects potential danger at the location and/or impairment of the person. Operation 1608 is next and includes assisting the person if the selective testing at the location and/or person indicates the danger at the location and/or impairment of the person. The assisting operation can include one or more of the assisting responses listed above. The method ends in operation 1610.

Other embodiments of the invention are possible. For example, other factors could be considered in screening the location, such as shaking or sudden starts or stops of the mechanisms existing at the location, or wild fluctuations in the operation of one or more modules previously listed. Another embodiment can deny people or other potentially dangerous persons entry through the doors of enclosed locations (e.g., power plants, utility plants, government facilities, educational facilities, department stores, and so forth).

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to assist a person in danger, comprising:
   screening a location or a person by one or more expert systems to detect a potential danger to a person;
   selectively testing said location or said person when said screening indicates a potential danger to said person; and
   assisting said person if said selective testing of said location or said person indicates said danger.

2. The method of claim 1, wherein said screening of said location or said person includes utilization of information derived from one or more existing modules selected from the group of existing modules consisting of: an operations module, an audio module, an information module, an security module, and a climate control module.

3. The method of claim 1, further comprising:
   allowing said person or one or more people in proximity to said person to activate a screening of said person for impairment by one or more expert systems.

4. The method of claim 1, further comprising measuring at least one characteristic of said person including one or more characteristics selected from the group consisting of: at least one chemical in proximity to said person, breathing rate of said person, blood pressure of said person, blood pulse rate of said person, blood oxygen level of said person, blood sugar level of said person, temperature of a portion of skin of said person, temperature in proximity to said person, one or more optical characteristics of at least one eye of said person, optical response to at least one stimulus of at least one eye of said person, at least one speech characteristic of said person, comparison of at least one speech characteristic of said person to a reference speech characteristic of said person, delay in response by said person to a prompt, a speed of dexterity of said person in performing at least one task, and a consistency of dexterity of said person in performing at least one task.

5. The method of claim 1, wherein said selective testing of said location or said person includes utilization of information derived from one or more existing modules selected from the group of existing modules consisting of: an operations module, an audio module, an information module, an security module, and a climate control module.

6. The method of claim 1, wherein said assisting includes one or more responses selected from the group of responses consisting of: advising a person of the safest evacuation route or a safer evacuation route from a location, advising said person of a second location having less danger or having emergency supplies, shielding said person from additional harm, changing a posture of said person, supplying medical drugs or other medical aid to said person, performing medical treatment on the impaired person, increasing or decreasing air temperature in proximity to said person, increasing or decreasing a supply of appropriate gases in proximity to said person, sending a warning message to summon medical assistance, contacting other entities, activating a radio beacon, assuring said person of one or more remedial actions, speaking to said person to minimize panic, tenor or anxiety of said person, disabling equipment at said location, disabling said equipment at said location after a time delay, temporarily disabling said equipment at said location for a pre-selected time duration, shutting off power to said equipment at said location, limiting operation of said equipment at said location to a lower speed of operation, limiting operation of said equipment at said location to allow only return of said equipment at said location to a pre-selected state or a pre-selected location, autonomously moving said equipment at said location to a second location, activating an alarm, sending a warning message to another entity for assistance, and issuing a warning message to said person.

7. The method of claim 1, wherein said selective testing utilizes one or more other factors chosen from the group of factors consisting of air temperature, oxygen level, carbon dioxide level, carbon monoxide levels, combustion by-product levels, nitrous oxide levels, ozone levels, hydrocarbon vapor levels, the presence of any gas associated with impairment, air humidity, air pressure, explosions or otherwise dangerous environmental decompression or compression of said person, fires, sound loudness levels in proximity to a module at a location, and a history of said location.

8. A method to assist a person in danger or having an impairment, comprising:
    screening a location or a person by one or more expert systems to detect a potential danger to said person;
    selectively testing said location or said person when said screening of said location or said person detects a potential danger at said location or a potential impairment of said person; and
    assisting said person if said selective testing of said location or said person indicates said danger at said location or said impairment of said person.

9. The method of claim 8, wherein said screening of said location or said person includes utilization of at least a portion of one or more existing modules selected from the group of existing modules consisting of: an operations module, an audio module, an information module, an security module, and a climate control module.

10. The method of claim 8, wherein said screening of said location or said person includes a time-sharing allocation of at least one processor executing at least one expert system.

11. The method of claim 8, further comprising:
    allowing said person or one or more people in proximity to said person to activate a screening of said location for a danger or activate a screening of said person for impairment by one or more expert systems.

12. The method of claim 8, further comprising measuring at least one characteristic of said person including one or more characteristics selected from the group consisting of: at least one chemical in proximity to said person, breathing rate of said person, blood pressure of said person, blood pulse rate of said person, blood oxygen level of said person, blood sugar level of said person, temperature of a portion of skin of said person, temperature in proximity to said person, one or more optical characteristics of at least one eye of said person, optical response to at least one stimulus of at least one eye of said person, at least one speech characteristic of said person, comparison of at least one speech characteristic of said person to a reference speech characteristic of said person, delay in response by said person to a prompt, a speed of dexterity of said person in performing at least one task, and a consistency of dexterity of said person in performing at least one task.

13. The method of claim 8, wherein said selective testing of said location or said person includes utilization of at least a portion of one or more existing modules selected from the group of existing modules consisting of: an operations module, an audio module, an information module, an security module, and a climate control module.

14. The method of claim 8, wherein said rescuing of said person includes one or more responses selected from the group of responses consisting of: advising a person of the safest evacuation route or a safer evacuation route from a location, advising said person of a second location having less danger or having emergency supplies, shielding said person from additional harm, changing a posture of said person, supplying medical drugs or other medical aid to said person, performing medical treatment on said impaired person, increasing or decreasing air temperature in proximity to said person, increasing or decreasing the supply of appropriate gases in proximity to said person, sending a warning message to summon medical assistance, contacting other entities, activating a radio beacon, assuring said person of one or more remedial actions, speaking to said person to minimize panic, tenor or anxiety of said person, disabling equipment at said location, disabling said equipment at said location after a time delay, temporarily disabling said equipment at said location for a pre-selected time duration, shutting off power to said equipment at said location, limiting operation of said equipment at said location to a lower speed of operation, limiting operation of said equipment at said location to allow only return of said equipment at said location to a pre-selected state or a pre-selected location, autonomously moving said equipment at said location to a second location, activating an alarm, sending a warning message to another entity for assistance, and issuing a warning message to said person.

15. The method of claim 8, wherein said selective testing of said location or said person includes a time-sharing allocation of one or more processors of one or more existing modules executing one or more expert systems.

16. The method of claim 8, wherein said selective testing selectively changes according to one or more other factors chosen from the group of factors consisting of air temperature, oxygen level, carbon dioxide level, carbon monoxide levels, combustion by-product levels, nitrous oxide levels, ozone levels, hydrocarbon vapor levels, the presence of any gas associated with impairment, air humidity, air pressure, explosions or otherwise dangerous environmental decompression or compression of said person, fires, sound loudness levels at a location, and history of said location.

17. A system to assist a person in danger, comprising:
   a screening module to screen and selectively test a location or a person when said screening indicates potential danger to said person, wherein said screening module utilizes one or more expert system modules in screening said location or said person; and
   an assisting module to assist said person if said selective testing of said location or said person indicates said danger at said location or said impairment of said person.

18. The system of claim 17, wherein said screening module includes one or more expert system modules that utilize at least a portion of one or more modules selected from the group of modules consisting of: an operations module, an audio module, an information module, an security module, and a climate control module.

19. The system of claim 17, wherein said assisting module uses one or more responses selected from the group of responses consisting of: advising a person of the safest evacuation route or a safer evacuation route from a location, advising said person of a second location having less danger or having emergency supplies, shielding said person from additional harm, changing a posture of said person, supplying medical drugs or other medical aid to said person, performing medical treatment on said person, increasing or decreasing air temperature in proximity to said person, increasing or decreasing the supply of appropriate gases in proximity to said person, assuring said person of one or more remedial actions, speaking to said person to minimize panic, terror or anxiety of said person, disabling equipment at said location, disabling said equipment at said location after a time delay, temporarily disabling said equipment at said location for a pre-selected time duration, shutting off power to said equipment at said location, limiting operation of said equipment at said location to a lower speed of operation, limiting operation of said equipment at said location to allow only return of said equipment at said location to a pre-selected state or a pre-selected location, activating an alarm, sending a warning message to another entity for assistance, and issuing a warning message to said person.

20. The system of claim 17, wherein said screening module includes at least one module to measure at least one characteristic of said location or said person selected from the group of characteristics consisting of: at least one chemical in proximity to said location, temperature in proximity to said person, breathing rate of said person, blood pressure of said person, blood pulse rate of said person, blood oxygen level of said person, blood sugar level of said person, temperature of a portion of skin of said person, one or more optical characteristics of at least one eye of said person, optical response to at least one stimulus of at least one eye of said person, at least one speech characteristic of said person, comparison of at least one speech characteristic of said person to a reference speech characteristic of said person, delay in response by said person to a prompt, a speed of dexterity of said person in performing at least one task, and a consistency of dexterity of said person in performing at least one task.

* * * * *